Nov. 17, 1953

C. C. AVERILL 2,659,484

DEVICE FOR PACKAGING TIRE CASINGS
AND THE TIRE CASING ASSEMBLIES

Filed June 1, 1950

INVENTOR.
Charles C. Averill
BY
Otis A. Earl
Attorney.

Nov. 17, 1953

C. C. AVERILL 2,659,484

DEVICE FOR PACKAGING TIRE CASINGS
AND THE TIRE CASING ASSEMBLIES

Filed June 1, 1950

INVENTOR.
Charles C. Averill
BY
Otto A. Earl
Attorney.

Patented Nov. 17, 1953

2,659,484

UNITED STATES PATENT OFFICE 2,659,484

DEVICE FOR PACKAGING TIRE CASINGS AND THE TIRE CASING ASSEMBLIES

Charles C. Averill, Albion, Mich., assignor to Union Steel Products Company, Albion, Mich.

Application June 1, 1950, Serial No. 165,502

7 Claims. (Cl. 206—65)

This invention relates to improvements in devices for packaging tire casings and the tire casing assemblies.

The principal objects of this invention are:

First, to provide a tire casing packaging or device which effectively retains a plurality of casings for handling as a unit and may be very quickly applied or removed from the casings.

Second, to provide a tire casing assembly constituting a plurality of tire casings which may be rolled about or otherwise manipulated in handling as for shipment and storage and at the same time an assembly unit that can be radially disassembled.

Third, to provide a packaging device for tire casings having these advantages which is light in weight and may be applied and removed without the aid of tools.

Objects relating to details and economies of the invention will appear from the description to follow. The invention is defined and pointed out in the claims.

A preferred embodiment of the invention is illustrated in the accompanying drawings, in which.

Figures 1, 2:
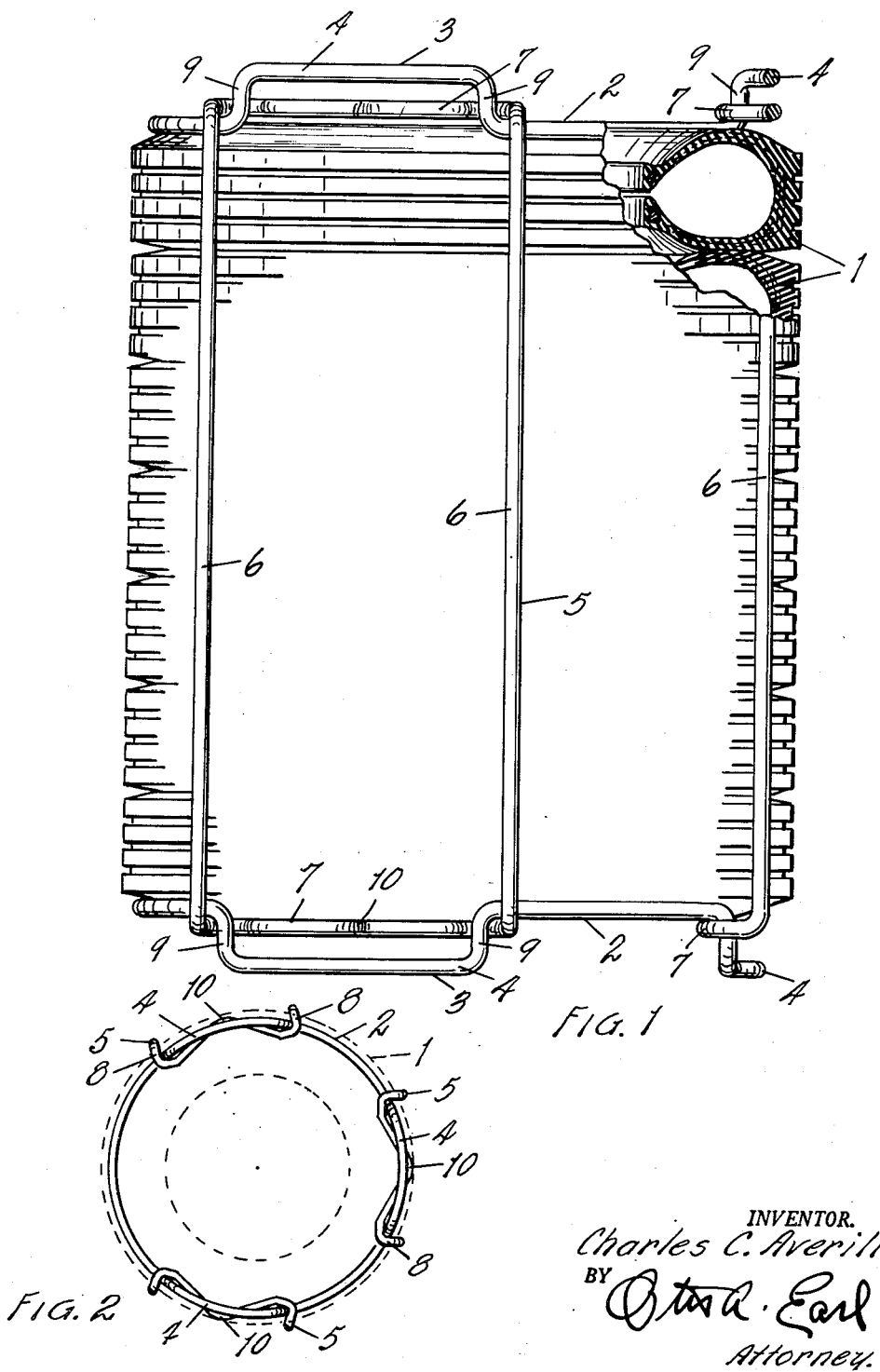
Fig. 1 is a side elevational view of a tire casing assembly embodying my invention with portions broken away and in section, parts of the assembly of casings being shown conventionally.
Fig. 2 is an end view of the assembly reduced in size, tire casings being indicated by dotted lines.

It is the general practice to ship the tires in bulk in carload lots with the tires interlaced with each other to effect a stable pile. This method results in the tires on the lowest tier being deformed, and frequently damaged by the weight of the tires above. The embodiment of my invention illustrated permits the assembling of a plurality or group of tire casings in side by side stacked relation and effectively securing them in such relation so that they may be handled as a unit and rolled about or otherwise handled as may be found most convenient.

In the accompanying drawing, 1 represents a tire casing of conventional type. The packaging device of my invention comprises annular end members 2 formed of heavy wire or light rod stock and having angularly and uniformly spaced axially disposed loop-like offsets 3 therein, the bights 4 of the offsets being desirably curved to correspond to the curvature of the end members. The end members are so proportioned as to locate the contact points along the thickest part of the tread for the purpose of protecting the sidewalls of the tires.

The longitudinal tie members 5 comprise spaced side members 6—6 and connecting cross members 7 inwardly offset at 8 relative to the side members 6 of the tie members. The cross members are of such length that the offsets 8 embrace the offsets 9 of the end member loops 3.

Figure 3:
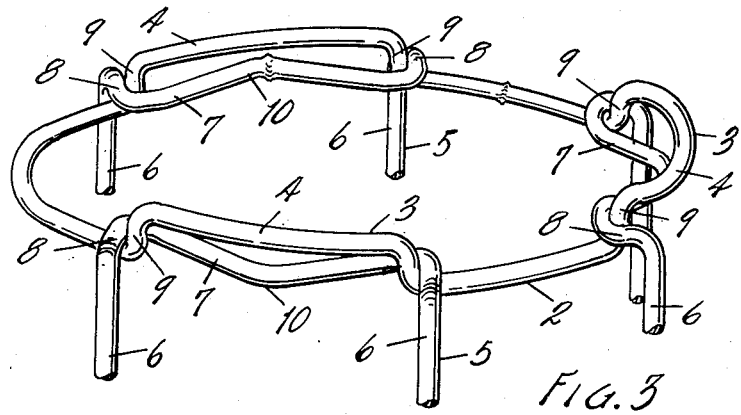
Fig. 3 is a fragmentary perspective view of the embodiment of my invention shown in Figs. 1 and 2.

In the embodiment of Figs. 1, 2, and 3, the cross members 7 are of V shape and are so conformed and proportioned that their tips 10 project under the bights of the end member loops 3. This results in effect in the longitudinal tie members having hooks that are engageable with the end members.

In assembling a group of tire casings, they are disposed in side by side aligned relation desirably in a vertical stack with one of the end members at the bottom of the stack. The other end member is placed on top of the stack. The longitudinal tie members are then engaged with the bottom end member, and this may be done successively and the stack of tires compressed to permit hooking engagement of the longitudinal members with the end member at the top of the stack. The compressed tire casings will tend to expand, and the result is that the group of tires are secured and effectively retained in assembled relation so that they may be handled as a unit when desired. When it is desired to disassemble the unit, the casings are compressed sufficiently to permit the disengagement of the tie members.

Figure 4:
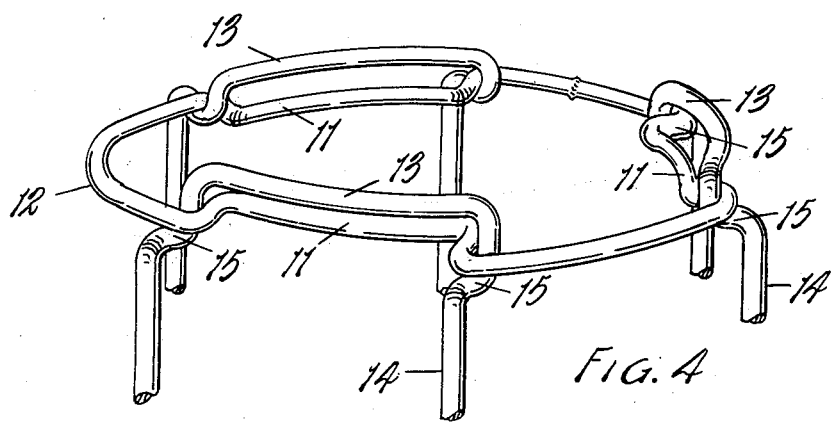
Fig. 4 is a fragmentary perspective view of a modified form or embodiment of my invention.

In the modification shown in Fig. 4, the loops 11 of the end member 12 are offset radially inward instead of being axially offset as shown in the embodiment of Figs. 1 to 3 inclusive. In this embodiment, the cross members 13 of the tie members 14 are inwardly offset at 15 and project upwardly from the inward offsets 15 so that their bights may be engaged over the end member loops 11. The cross members 13 engage the ends of the loops to prevent peripheral movement.

Figure 5:
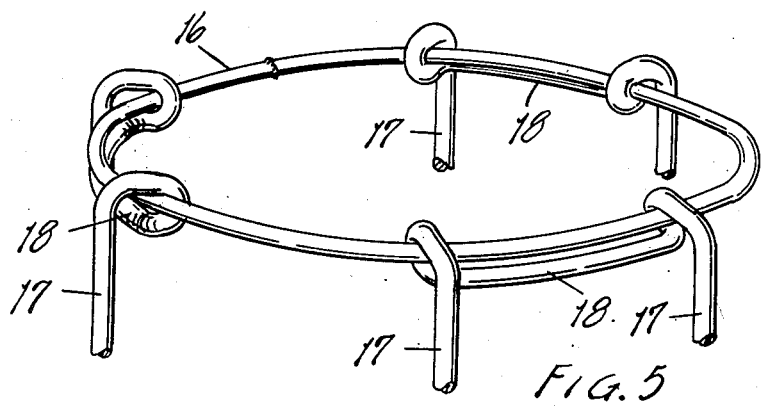
Fig. 5 is a perspective view of a further modification or embodiment of my invention.

In the embodiment shown in Fig. 5, the annular end members 16 are without offsets. In this embodiment, the longitudinal members 17 have downwardly offset, outwardly projecting cross members 18 which constitute hooks engageable with the end members. The embodiments previously described have, however, the advantage of positively preventing peripheral shifting of the longitudinal members and the definite location of the longitudinal members relative to the end members and to the group of tire casings. In the embodiment of Fig. 5, care should be taken by the assembler to properly space the longitudinal tie members. The embodiment of Fig. 5 has the advantage of there being no substantial endwise projecting portions in the assembled unit.

I have illustrated and described my invention in embodiments which I have found to be highly practical. I have not attempted to illustrate or describe other adaptations or embodiments which I contemplate, as I believe this disclosure will enable those skilled in the art to embody or adapt my invention as may be desired.

Having thus described my invention, what I claim as new and desire to secure by Letters Patent is:

1. A tire casing assembly comprising a plurality of tire casings disposed in side by side relation, annular end members of a diameter approximating but somewhat less than the outside diameter of the casings, said end members having a plurality of angularly and uniformly spaced axially offset loops therein, and a plurality of longitudinal tie members each comprising spaced side members and inwardly offset cross members engaged over said offsets of said end members and in axial thrust sustaining engagement with the end members, said cross members being of V shape and engageable under the loops of the end members, the longitudinal members being engaged with the end members with the tire casings under sidewise compression stress.

2. A tire casing assembly comprising a plurality of tire casings disposed in side by side relation, annular end members of a diameter approximating but somewhat less than the outside diameter of the casings, said end members having a plurality of angularly and uniformly spaced axially offset loops therein, and a plurality of longitudinal tie members each comprising spaced side members and inwardly offset cross members engaged over said offsets of said end members and in axial thrust sustaining engagement with the end members, the longitudinal members being engaged with the end members with the tire casings under sidewise compression stress.

3. A tire casing assembly comprising a group of tire casings disposed in side by side relation, annular end members disposed at the outer sides of the end casings of the group, said end members having angularly spaced axially offset loops therein, and a plurality of longitudinal tie members disposed to embrace the peripheries of the casings and each comprising spaced side members and connecting inwardly offset cross members engaged with said offsets of said end members and in axial thrust sustaining engagement with the end members with the group of tire casings under compression stress.

4. A tire casing assembly comprising a group of tire casings disposed in side by side relation, annular end members disposed at the outer sides of the end casings of the group, and a plurality of longitudinal tie members disposed to embrace the peripheries of the casings and each comprising spaced side members and connecting inwardly offset cross members engaged with said end members with the group of tire casings under compression stress said tie members having portions thereof disposed axially outwardly of said end members to prevent axially outward displacement of the end members and having portions thereof disposed axially inwardly of said end members to prevent axially inward displacement of said end members and having portions thereof disposed radially inwardly of the end members to prevent radial outward displacement of said tie members, said cross and end members having hook portions including said axially and radially disposed portions releasably interlockingly connecting the tie and end members to each other.

5. A tire casing assembly comprising a group of tire casings disposed in side by side relation, annular end members disposed on the outer sides of the end casings of the group, and a plurality of longitudinal tie members disposed to embrace the group of casings peripherally and having inwardly offset cross members engaged with the end members with the group of tire casings under compression stress said tie members having portions thereof disposed axially outwardly of said end members to prevent axially outward displacement of the end members and having portions thereof disposed axially inwardly of said end members to prevent axially inward displacement of said end members and having portions thereof disposed radially inwardly of the end members to prevent radial outward displacement of said tie members, said cross and end members having hook portions including said axially and radially disposed portions releasably interlockingly connecting the tie and end members to each other.

6. A tire casing assembly comprising a group of tire casings disposed in side by side relation, annular end members disposed on the outer sides of the end casings of the group, and a plurality of longitudinal tie members engaged with the end members with the group of tire casings under compression stress, said tie members having portions thereof disposed axially outwardly and axially inwardly of said end members to prevent axial displacement of said end members and having portions disposed radially inwardly of said end members to prevent radial outward displacement of said tie members, said tie and end members having hook-like portions including said axially and radially disposed portions, releasably interlockingly connecting said tie and end members to each other.

7. A tire case assembly comprising a group of tire casings arranged in side by side relation, annular end members arranged on the outer sides of the end casings of the group, said annular end members having angularly spaced loop-like radially disposed offsets therein, and longitudinal tie members disposed to engage the periphery of the group of tires and comprising pairs of side members and loop-like connecting end members, said loop-like connecting end members being radially inwardly and then axially outwardly offset, the radial loop-like offsets of the annular end members projecting radially inwardly through the connecting loop-like end members with the annular end members supported against axially inward displacement on the radially inward offset portions of the connecting loop-like end members, the tie members being engaged with the annular end members with the tire casings under sidewise compression stress.

CHARLES C. AVERILL.

References Cited in the file of this patent

UNITED STATES PATENTS

| Number | Name | Date |
|---|---|---|
| 1,355,042 | Harwood | Oct. 5, 1920 |
| 2,228,787 | Snyder | Jan. 14, 1941 |

FOREIGN PATENTS

| Number | Country | Date |
|---|---|---|
| 93,218 | Switzerland | Mar. 1, 1922 |
| 451,640 | Germany | Oct. 24, 1927 |
| 614,371 | Great Britain | Dec. 14, 1948 |